Nov. 23, 1954  M. J. ANDERSON  2,695,095
CONVEYER CHAIN LINK
Filed Dec. 5, 1950
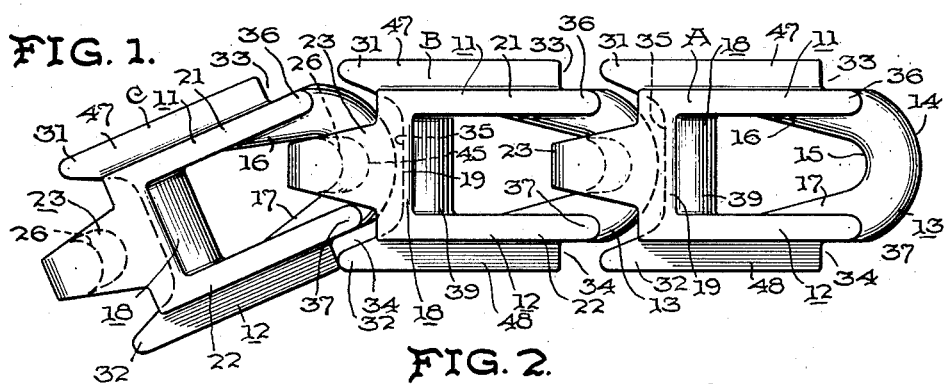
FIG. 1.
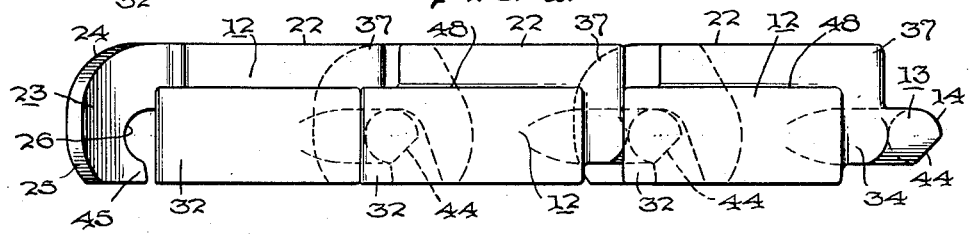
FIG. 2.
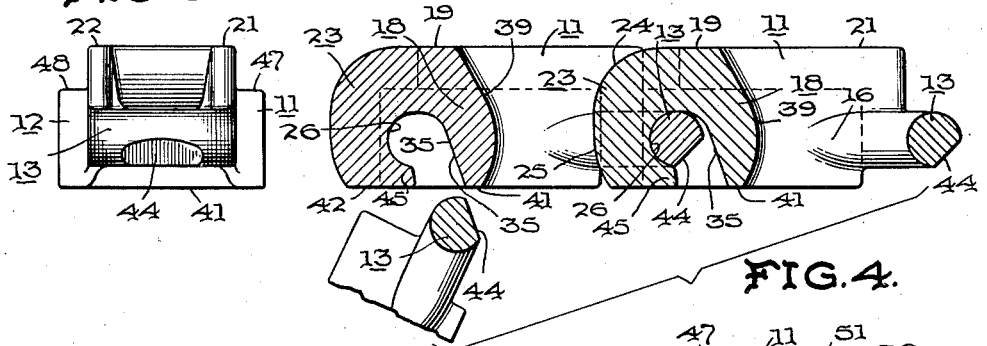
FIG. 3.
FIG. 4.
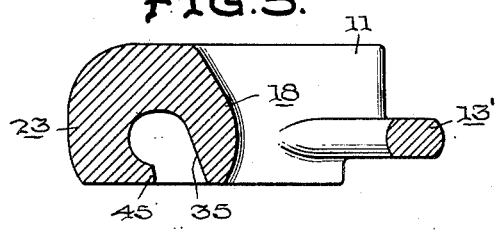
FIG. 5.
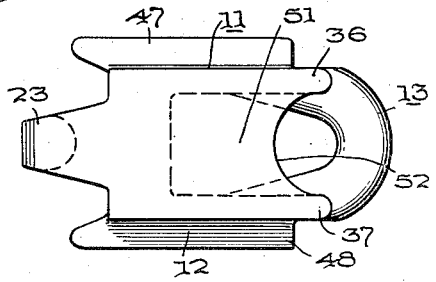
FIG. 6.
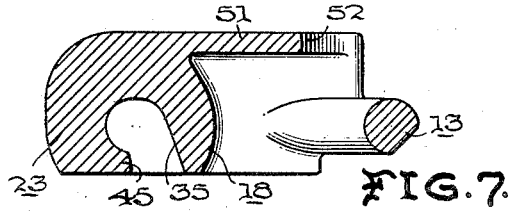
FIG. 7.
INVENTOR.
MARTIN J. ANDERSON
BY William E. Schuyler Jr.
his ATTORNEY

United States Patent Office 2,695,095
Patented Nov. 23, 1954

2,695,095

CONVEYER CHAIN LINK

Martin J. Anderson, Ellwood City, Pa., assignor to Mathews Conveyer Company, Ellwood City, Pa., a corporation of Pennsylvania Application December 5, 1950, Serial No. 199,289

9 Claims. (Cl. 198—189)

This invention relates to conveyor chains of the load carrying type, such as drag chains, which have a series of articulated links with load carrying surfaces.

Experience has shown that the wear of the coupling members of conveyor chain links is accelerated by the accumulation of dirt and grit between the relatively moving parts of connected links. A major object of this invention is to reduce the exposure of these relatively moving parts of the chain links, and also to eliminate crevices and sharp corners in the chain links where dirt and grit is most likely to accumulate. In accordance with this object, one feature of the invention resides in arrangements of shields adjacent relatively moving parts of the chain links to reduce the amount of dirt and grit which reaches these parts.

Another object of the invention is to provide a chain ink with rounded corners and thereby eliminating those places where dirt is most likely to accumulate.

It is desirable that articulated chains of this type be flexible so they may move in all four major directions relative to their major direction of travel. In making horizontal turns, a single large diameter wheel, mounted on a vertical axis, may be utilized, with its periphery engaging the sides of the chain links on the inner side of the turn. In making a horizontal turn, the chain links approach the wheel in a tangential direction so they will smoothly contact the periphery of the wheel. If the wheel has a radius corresponding to the radius of the turn, the chain links will remain in contact with the wheel at points approximately in the center of the side of each link, until the turn is completed and the link leaves the wheel in another tangential path. In many installations, it is desirable to eliminate large diameter wheels and substitute a series of wheels of relatively small diameter extending along the inner side of the horizontal turn. When a series of small wheels are employed, the sides of the connected links successively engage the series of small wheels extending around the turn. Heretofore, considerable noise and wear has resulted from the engagement of the leading edges of the links with the peripheries of the small wheels. Instead of presenting a substantially continuous surface for engagement with the small wheels, the side of the chain links now in use form a series of humps which successively engage each wheel of the series.

Another object of the invention is to provide a conveyor chain link with sides which, when connected with other links to form a chain, present a series of short tangential faces for contacting the small wheels on a horizontal curve. In the attainment of this object, another important feature of the invention resides in the arrangement of side extensions flanking the hook at one end of the link. More specifically, the sides of the links are so arranged that they extend from the hook engaging surface of the coupling bar at one end of the link to the coupling bar engaging surface of the hook at the other end of the link; the sides having cooperating recesses to permit overlapping of the sides of connected links so the short tangential surfaces formed by the sides of the chain links merge and present a continuous surface extending around the curve.

Another object of the invention is to provide suitable surfaces on the chain links for engagement by holddown devices on the turns. This is accomplished by shoulders extending longitudinally along the sides of the chain links and exposed so they may be engaged by holddown devices at horizontal turns.

As the chain link makes horizontal turns in both directions, so, also, it must make vertical turns in both directions. In making vertical turns, it is the usual practice to provide sprockets having teeth which enter into suitable pockets formed in the individual chain links. Another specific object of this invention is to provide for vertical movement of the conveyor chain in both directions, thereby enabling the conveyor chain to be turned in any of the four directions relative to its direction of travel. This is accomplished by providing suitable recesses in the central portion of the individual chain links, which recesses may be entered by sprocket teeth either above or below the conveyor chain. Still another specific object of the invention is to provide a conveyor chain link in which suitable thrust surfaces are provided so the teeth of the sprocket may act in either direction upon the chain link. This permits reversal of movement of the chain without sacrificing any of the strength of the chain.

In the attainment of these objects, the conveyor chain link has a transverse web with a convex surface facing toward the connecting bar at one end of the chain link. Projecting from this web, in a direction away from the coupling bar, is a hook. The hook projects from the upper portion of the web downwardly and has a lower curved portion extending downwardly toward the web. The concave surface of the hook for engaging the coupling bar faces the web. This arrangement permits a sprocket tooth to be inserted from either the top or the bottom of the chain link. Such a sprocket tooth will engage either the web surface which faces the connecting bar to move the chain link in direction of the hook on it, or engages the exposed surface of the hook of another link connected to the connecting bar to move the first chain link in the direction of its connecting bar. Another feature of the invention resides in the provision of a large sprocket pocket by having the sprocket engaging the web at one end of the link or the exposed surface of a hook connected to the coupling bar at the other end of the link.

One difficulty encountered with large links of this type, where a hook at one end engages a coupling bar at the other end, is that the hook and coupling bar become disconnected as the links leave a sprocket to enter, for example, the return flight of the conveyor chain. Still another object of the invention is to provide for a quick assembly or disassembly of the hook of one link and the coupling bar of another link, without permitting the parts to become disengaged as they pass around vertical turns. In the accomplishment of this object, another feature of the invention resides in the provision of a coupling with a greater thickness in one direction than the thickness in another direction, with the end of the hook on the link spaced from the web of the link a distance less than the greater thickness of the coupling bar, but greater than the lesser thickness of the coupling bar. By proper positioning of the lesser thickness of the bar, the links may readily be assembled by turning them to a greater angle than they are normally turned in making vertical turns.

Other objects and advantages of the invention will become apparent from the following specification taken in connection with the accompanying drawings, wherein:

Figure 1 is a top plan view of a series of articulated chain links embodying the invention in its preferred form;

Figure 2 is a side elevation of the chain links shown in Figure 1;

Figure 3 is an elevational view of the coupling bar end of one of the links shown in Figure 1;

Figure 4 is a vertical section view through the center of articulated links such as those shown in Figure 1, with one link shown in position to be engaged with the other links;

Figure 5 is a vertical sectional view through the center of a chain link having a modified coupling bar;

Figure 6 is a top plan view of a conveyor chain link embodying a modified form of the invention; and Figure 7 is a vertical sectional view through the conveyor chain links shown in Figure 6.

Referring now to the drawings, the conveyor chain links shown in Figure 1 each have a pair of transversely spaced side members 11 and 12. Formed integral with and connected between the side members 11 and 12, at one end, is a coupling bar 13 which, in this form of the invention, is of substantially circular cross section, and is curved in an arc extending from the ends of the side members 11 and 12. This coupling bar presents an exposed outer surface 14 at the end of the link of convex formation both in a horizontal direction and in a vertical direction. Inner surface 15 of the coupling bar 13 is of concave formation in a horizontal direction but convex in a vertical direction. At their juncture with the coupling bar, side member 11 has on its inner area a thickened portion 16 and side member 12 has a similar thickened portion 17. These thickened portions form continuations of the coupling bar 14 so the coupling bar merges with the side members. Spaced from the other end of the link, and also formed integrally with the side members 11 and 12, is a transverse web 18 having its top surface 19 substantially flush with the top surfaces 21 and 22 of the side bars 11 and 12, respectively. These flat top surfaces provide load-carrying surfaces for the conveyor chain. As will be noted in Figure 1, the contiguous links form a series of rectangular supporting surfaces with the sides formed by upper surfaces 21 and 22 of the side members 11 and 12, and the ends formed by upper surface 19 in the web of one link and the corresponding upper surface 19 in the web of a contiguous link. Projecting from the upper surface of web 18 in a direction away from coupling bar 13 is a hook 23 having one curved portion 24 of its exposed surface extending downwardly away from the web 18 and another curved portion 25 of its exposed surface extending downwardly toward the web 18. Thus, this exposed surface of the hook 23 is of convex formation for a purpose to be described. The inner surface of hook 23 is of concave formation in a vertical direction to provide a suitable surface, as at 26 (Figure 4), for engaging the coupling bar 13 of a connected link. This inner surface 26 of the hook is concave only in a vertical direction; the inner surface of the hook being convex in a horizontal direction for providing swinging movement of the hook and its connected link relative to the coupling bar 13 of a contiguous link. Thus, hook 23 has its inner surface, facing the web 18, of horizontal convex formation and vertical concave formation.

For the purpose of shielding the sides of the coupling, between the hook and the coupling bar of contiguous links, and to provide a continuous surface for engagement with guide wheels when turning about a horizontal turn, side members 11 and 12 of the link extend beyond the web 18 with side extensions 31 and 32 flanking the sides of hook 23. Side extensions 31 and 32 have their extremities transversely aligned with the concave surface 26 at the point where it engages coupling bar 13. Also, the ends of side members 11 and 12 adjacent coupling bar 13 have their outer surfaces recessed at 33 and 34 to accommodate the side extensions 31 and 32 of a connected link.

As illustrated in Figure 1, links A and B are longitudinally aligned so side extensions 31 and 32 of the link A flank hook 23 on the link A and, also, flank the coupling bar 13 of the link B. As best illustrated in Figure 1, the inner surfaces of the link, extending from the inner side of side extension 31 across the face 35 of web 13 which faces horizontally convex surface 26 of the hook 18, and continuing along the inner side of side extension 32, is of concave formation approximately complementing the convex formation of the exposed surface 14 on coupling bar 13 of the link B. With this arrangement, the links are permitted to turn about an axis extending heightwise through the point of contact between concave surface 15 on the coupling bar 13 and inner surface 26 on hook 23.

It will also be observed that extremities 36 and 37 on side members 31 and 32, at the coupling bar 13, are substantially transversely aligned with the point of the contact on the concave surface 15 of the coupling bar 13. Hence, when two connected links are longitudinally aligned, as is the case of links A and B in Figure 1, the side extensions 31 and 32 have their extremities terminating in a line transversely through the point of contact between the coupling bar of link B with the hook of the link A. Also, extremities 36 and 37 of the side members 11 and 12 are transversely aligned at the same point, namely, the axis for horizontal turning movement of link B relative to link A. With this arrangement of side extensions 31 and 32 flanking hooks 23 and overlapping the coupling bar 13 on the connected link, the side extensions 31 and 32 with extremities 36 and 37 of the connected link completely shield the relatively moving parts of the two links. This shielding is effective when the links are aligned and also when they are turning relative to one another as when they are turning in a horizontal direction as illustrated by the relative positions of links B and C in Figure 1.

In addition to preventing the accumulation of dirt and grit which will contaminate the coupling, it will be noted that side extension 32 of the link B has moved into recess 34 formed in the side of link C. In this position, the exposed surface of side member 12 of link C forms a continuous line with the exposed surface of the corresponding side member 12 of link C. Thus, as the conveyor chain moves successively around a series of small diameter wheels, the leading edge of the side members will not repeatedly strike the individual wheels. Rather, the successive links will move smoothly into and off of each wheel around the turn because the sides of the links provide a series of short tangential contact surfaces engaging the wheels.

Web 18 is formed with a vertically convex surface 39 facing coupling bar 13. This concave surface 39 curves from top surface 19 of the web downwardly toward the coupling bar and then downwardly away from the coupling bar to bottom surface 41 of the web 18. This is best illustrated in Figure 4 where it will be observed that bottom surface 41, together with the bottom surfaces of the side members 11 and 12, as well as the bottom surface 42 of hook 23, are flush to provide flat sliding surfaces to rest upon a support for the conveyor chain.

As may be noted in Figure 4, convex surface 39 of web 18 facing coupling bar 13 is arranged to cooperate with one side of the tooth on a sprocket whereas the exposed convex surfaces 24 and 25 of the hook 23 are arranged to engage the opposite edge of a tooth on the sprocket. Thus, the substantially parallel inner sides of side members 11 and 12 and the convex surfaces of web 18 and hook 23 form a pocket for receiving the tooth of a sprocket. It will be noted that the longitudinally opposed ends of this pocket diverge upwardly and downwardly from the central area of the link. Thus, a tapered tooth may be inserted into the top of the bottom of the sprocket. Customarily, the tooth is inserted in the bottom.

Such a tooth may engage either the surface of the web or the surface of the hook depending upon the direction in which the chain is moved. In either case, the force from the tooth of the sprocket is applied directly to a major part of this same link. Actually, the force is applied to either one side or the other of the hook and thereby directly transmitted to the coupling bar of the same link or to the coupling bar of a connected link. Assuming that a sprocket tooth is inserted in the pocket of the left-hand link shown in Figure 4 and moved in a clockwise direction, it will be apparent that the tooth of the sprocket will act through the hook 23 directly to the coupling bar 13 of the link in which the sprocket is engaged. If the sprocket is moved in the opposite direction, the sprocket tooth will engage convex surface 39 of the web 18 of the left-hand link and thereby be transmitted to a coupling bar connected in the hook of that link or through the side members of the left-hand link to the coupling bar of the same link. This is equally true whether the sprocket is inserted in the top or the bottom of the link.

To provide for the quick assembly of a series of links into a chain, each link has its coupling bar 13 provided with a thinner portion in one direction. For example, the exposed convex part of the coupling bar may have a flattened portion 44. The exact position of this thinner dimension, determined by the flattened surface 44, is dependent upon the angle at which it is desired to assemble the coupling bar of one link with the hook of a connected link. Tip 45 of the hook 23 is spaced from the bottom surface of web 18 a distance less than the diameter of the circular cross section of coupling bar 13, but a distance greater than the thickness of the coupling bar 13, as measured from its flattened surface. Thus, by aligning the flattened surface 44 with the surface 35 of the web 18, which faces the hook 23, the coupling bar may be inserted into the concave portion of the hook, as best illustrated in Figure 4. In the event it is desired to assemble the two links at an even greater angle than is illustrated in Figure 4, the flattened edge 44 on the coupling bar may be moved nearer to the bottom part of the coupling bar. As will be apparent, the greater angle at which the links are assembled, the sharper a vertical turn they may make without becoming disassembled.

Another way of providing different dimensions for the coupling bar is illustrated in Figure 5. Instead of a circular cross section, coupling bar 13' has an oval or elliptical cross section with its major axis extending longitudinally of the chain link and its minor axis extending heightwise of the chain link. With this arrangement, the major axis of the elliptical cross section of the coupling bar is of greater length than the distance between tip 45 on hook 23 and face 35 on web 18, while the minor axis has a length smaller than the same distance. In the form illustrated, two links must be turned at right angles to each other in order to hook or unhook them. This angle may be varied as desired by changing the axes of the elliptical cross section of the coupling bar to different positions. If the links are assembled as illustrated in Figure 2, the full diameter of the coupling bar is extended across the space between tip 45 on the hook and the bottom of the web 18. Thus, the coupling bar cannot fall out of its position in the hook.

As previously mentioned, chains of this type sometimes have a tendency to ride up the guide wheels as they make horizontal turns. To provide for engagement by suitable holddown devices, the link of this invention has shoulders 47 and 48 extending horizontally outwardly from side members 11 and 12, respectively. Preferably, these shoulders extend the whole distance from side extensions 31 and 32 to the recesses 33 and 34 formed in the side members. Stated another way, the side members 11 and 12 may be considered as having main inner sections extending from the web 18 to the coupling bar, and shorter outer sections spaced below the top of the inner sections and extending from the concave engaging portion on the hook rearwardly to points short of the ends 36 and 37 of the main inner sections of the side members.

In Figures 6 and 7, there is illustrated a modified form of link which is constructed identically with the chain links previously discussed, but is provided with a top cover 51 extending from the top surface of web 18 to the ends 36 and 37 of the side members 11 and 12. To permit relative turning movement of the link about a vertical axis, top 51 has an arcuate edge 52 at the end of the link adjacent coupling bar 13. Arcuate edge 52 extends from ends 36 and 37 of the side members 11 and 12 in a direction away from the coupling bar 13.

With all forms of the link, the accumulation of dirt and grit at the relatively moving hooks and coupling bars is effectively prevented by the overlapping of side extensions 31 and 32 with respect to the coupling bar 13 of a connected link and the corresponding overlapping of extensions 36 and 37 of the side members with respect to the hook 23 of a connected link. Furthermore, the arrangement of the extremities of the side members coincident with the transverse line through the point of contact and axis of rotation of connected links provides a substantially continuous surface along the exposed sides of the side members as the links make horizontal turns.

The particular arrangement of the hook extending from the top of the web and the coupling bar at the rear of the side members provides a very strong yet very simple construction. The tension or compression forces for moving the chain are transmitted from the coupling bar of one link to one side or the other of the hook on a connected link. Also, the motive force from a sprocket tooth is transmitted from one link to a connected link of the chain by engagement of one side or the other of the hook with the coupling bar. In other words, the teeth of the sprocket either engage the web or the exposed surface of the hook both of which surround the coupling bar of an adjoining link. Thus, a compression force is transmitted directly through the contacted part of one link to the coupling bar of a connected link. Of course, a tension or compression force is also directly transmitted to the coupling bar of the same link with which the tooth of the sprocket is engaged. This particular arrangement of the parts of one tooth surrounding the coupling bar of another provides ample space in the remainder of the link so the use of a relatively large sprocket tooth is permitted without sacrificing clearance in the body of the link and without unduly lengthening the link. Although the modification of the link, as shown in Figures 6 and 7, permits insertion of sprockets only from the bottom, the preferred form of the invention, as illustrated in Figures 1 to 4, inclusive, permits the sprocket tooth to be inserted either above or below the link and thereby permits the same to turn in either vertical direction.

The arrangement of shoulders extending longitudinally along both sides of the ring provide ample surfaces for engagement with holddown devices to prevent the link from moving vertically in making horizontal turns. As already described, the interlocking coupling of the coupling bar of one link with the hook of another link facilitates assembling of the various links in the chain, but prevents these links from becoming separated during normal operations.

What is claimed is:

1. A conveyor chain link comprising a pair of side members, a coupling bar extending between said members at one end, a transverse web extending between said members intermediate the ends thereof, and a hook projecting from said web between the free ends of said side members, each of said side members being formed with a recess in its side surface at said one end to receive the corresponding free ends of the side members on a connected link to form a substantially continuous surface along the side of an articulated chain.

2. A conveyor chain link comprising a pair of side members, a coupling bar extending between said members at one end, a transverse web extending between said members intermediate the ends thereof, and a hook projecting from said web between the free ends of said side members, said free ends being narrower than the remainder of said side members, said side members being formed with recesses in their outer surfaces adjacent said coupling bar to receive the narrower ends of the side members on a connected link to form a substantially continuous surface along the side of an articulated chain.

3. A conveyor chain link comprising a pair of side members, a coupling bar extending between said members at one end, a transverse web extending between said members intermediate the ends thereof, and a hook projecting from said web between the free ends of said side members for connection to another link having its coupling bar between said free ends, said side members being formed with shoulders extending longitudinally along their exposed side surfaces for engagement with holddown wheels.

4. A conveyor chain link comprising transversely spaced side members, a coupling bar extending between said members at one end, a transverse web extending between said members, a hook projecting from said web having a concave surface facing said web to engage the coupling bar on a connected link, and side extensions on said side members flanking said hook and transversely spaced a distance greater than the transverse dimension of the link in the vicinity of said coupling bar, so said side extensions overlap the coupling bar end of the side members on a connected link to form a substantially continuous surface along the side of an articulated chain.

5. A conveyor chain link comprising transversely spaced side members, a coupling bar extending between said members at one end, a transverse web extending between said members, a hook projecting from said web having a concave surface facing said web to engage the coupling bar on a connected link, and side extensions on said side members flanking said hook and having their extremities substantially transversely aligned with said concave surface, said extensions being transversely spaced a distance greater than the transverse dimension of the link in the vicinity of said coupling bar, so said side extensions overlap the coupling bar end of the side members on a connected link to form a substantially continuous surface along the side of an articulated chain.

6. In a conveyor chain link having a coupling bar at one end and a hook at the other end, side members having their extremities at said one end substantially transversely aligned with the hook engaging surface of the coupling bar and having their extremities at said other end substantially transversely aligned with coupling bar engaging surface of the hook to form a substantially continuous side surface on an articulated chain.

7. In a conveyor chain link having a coupling bar at one end and a hook at the other end, side members having their extremities at said one end substantially transversely aligned with the hook engaging surface of the coupling bar and having their extremities at said other end substantially transversely aligned with the coupling bar engaging surface of the hook, said side members being formed with complementary recesses at both ends permitting overlapping of side members on connected links of an articulated chain.

8. In a conveyor chain link having a coupling bar at one end and a hook at the other end, side members having their extremities at said one end substantially transversely aligned with the hook engaging surface of the coupling bar and having their extremities at said other end substantially transversely aligned with the coupling bar engaging surface of the hook, said side members being formed with recesses in their outer surfaces at said one end and complementary recesses in their inner surfaces at said other end permitting overlapping of side members on connected links of an articulated chain.

9. In a conveyor chain link having a coupling bar at one end and a hook at the other end, side members having their extremities at said one end substantially transversely aligned with the hook engaging surface of the coupling bar and having their extremities at said other end substantially transversely aligned with the coupling bar engaging surface of the hook, said side bars each having their extremities offset in opposite directions permitting overlapping of the side members of connected links to form substantially continuous side surfaces on an articulated chain.

References Cited in the file of this patent

UNITED STATES PATENTS

| Number | Name | Date |
|---|---|---|
| 414,416 | Jennings | Nov. 15, 1889 |
| 1,915,939 | Lund | June 27, 1933 |
| 2,009,157 | Zilles et al. | July 23, 1935 |
| 2,024,846 | Burgess et al. | Dec. 17, 1935 |
| 2,080,301 | Bocchino | May 11, 1937 |
| 2,118,348 | Hoeffleur | May 24, 1938 |
| 2,243,274 | Ernst | May 27, 1941 |
| 2,249,720 | Ernst | July 15, 1941 |